United States Patent [19]

Nishina

[11] 4,253,622
[45] Mar. 3, 1981

[54] WEBBING RETRACTOR
[75] Inventor: Shuho Nishina, Toyota, Japan
[73] Assignee: Toyota Jidosha Kogyo Kabushiki Kaisha, Toyota, Japan
[21] Appl. No.: 90,402
[22] Filed: Nov. 1, 1979
[30] Foreign Application Priority Data Nov. 13, 1978 [JP] Japan ............................ 53-155887[U]

[51] Int. Cl.³ ...................... A62B 35/02; B65H 75/48
[52] U.S. Cl. .................... 242/107.4 A; 280/802; 280/806
[58] Field of Search ................ 242/107.4 R–107.4 E; 280/801–808; 297/475–480, 469

[56] References Cited
U.S. PATENT DOCUMENTS

| | | | |
|---|---|---|---|
| 2,708,555 | 5/1955 | Heinemann et al. | 242/107.4 A |
| 3,503,571 | 3/1970 | Martin | 242/107.4 A |
| 3,771,814 | 11/1973 | Hahn | 280/803 |
| 4,083,581 | 4/1978 | Clifford | 280/803 |
| 4,090,735 | 5/1978 | Czernakowski | 242/107.4 A |

Primary Examiner—John M. Jillions
Attorney, Agent, or Firm—Koda and Androlia

[57] ABSTRACT

The webbing retractor according to the present invention is suitably applied to a passive seatbelt system of the type, wherein one end of a webbing is secured to a door, whereby the webbing for restraining an occupant is automatically fastened to the occupant in accordance with the opening or closing of a door. Said retractor is provided therein with a release lever for forcedly separating a pawl meshed with a ratchet wheel solidly secured to a windup shaft so as to stop a webbing windoff rotation of the windup shaft in an emergency of the vehicle. Said retractor is further provided with a holding device for holding a condition where the release lever has been moved, so that the webbing can be unfastened from the occupant even when the vehicle is stopped in a tilted condition, thereby enabling the occupant to escape from the vehicle.

9 Claims, 12 Drawing Figures

WEBBING RETRACTOR

BACKGROUND OF THE INVENTION

1. Field of the Invention

This invention relates to a webbing retractor for use in a seatbelt system for protecting an occupant in an emergency of a vehicle.

2. Description of the Prior Art

Heretofore, there have been proposed a so-called automatically fastening type seatbelt system wherein a restraining webbing is automatically fastened to an occupant after he is seated so that the occupant can be reliably restrained and protected by the webbing in an emergency of the vehicle. In general, said seatbelt system is of such an arrangement that the outer end of the occupant restraining webbing is engaged with a door for entering or leaving the vehicle, and the intermediate portion of the webbing is movable forward or rearward in the vehicle in accordance with the opening or closing action of the door. Furthermore, in said seatbelt system, one end of the webbing is secured to the vehicle through an emergency locking retractor for stopping the wind-off of the webbing only in an emergency of the vehicle, so that the occupant can arbitrarily change his driving posture during normal running condition. Furthermore, said emergency locking retractor reliably stops the wind-off of the webbing in an emergency of the vehicle, whereby the occupant is restrained by the webbing so as to avoid colliding against dangerous obstacles, thus being protected safely.

However, in the seatbelt system as described above, in the case the occupant escapes from the vehicle to the outside in a stopping condition of the vehicle after a collision of the vehicle, said emergency locking retractor still remains in an operating condition preventing the webbing from being wound off from the retractor. With this arrangement, the occupant cannot unfasten the webbing from himself, and further, in the seatbelt system in which one outer end portion of the webbing is secured to the door, the webbing is made immovable, whereby the door cannot be opened, thus causing the occupant to be unable to leave the vehicle.

Furthermore, in the case a tilting sensor such as a pendulum is used as an acceleration sensor for the emergency locking sensor, if the vehicle stops on a slope inclined at a predetermined angle, such a disadvantage is presented that, despite the vehicle is not in an accelerated condition, the sensor stops the wind-off of the webbing.

SUMMARY OF THE INVENTION

The present invention contemplates to obviate the abovedescribed disadvantages, and therefore, an object of the present invention is to provide a webbing retractor wherein an emergency locking retractor is unlocked as necessary, so that the webbing can be wound off from the retractor.

In the webbing retractor according to the present invention, a release lever is provided which releases a pawl for meshing with a windup shaft as necessary, and said release lever is held in an operating condition by a holding device while being tilted, whereby holding an unlocked condition of the windup shaft.

Embodiments of the present invention will hereunder be described with reference to the drawings.

DESCRIPTION OF THE PREFERRED EMBODIMENT

Figure 1:
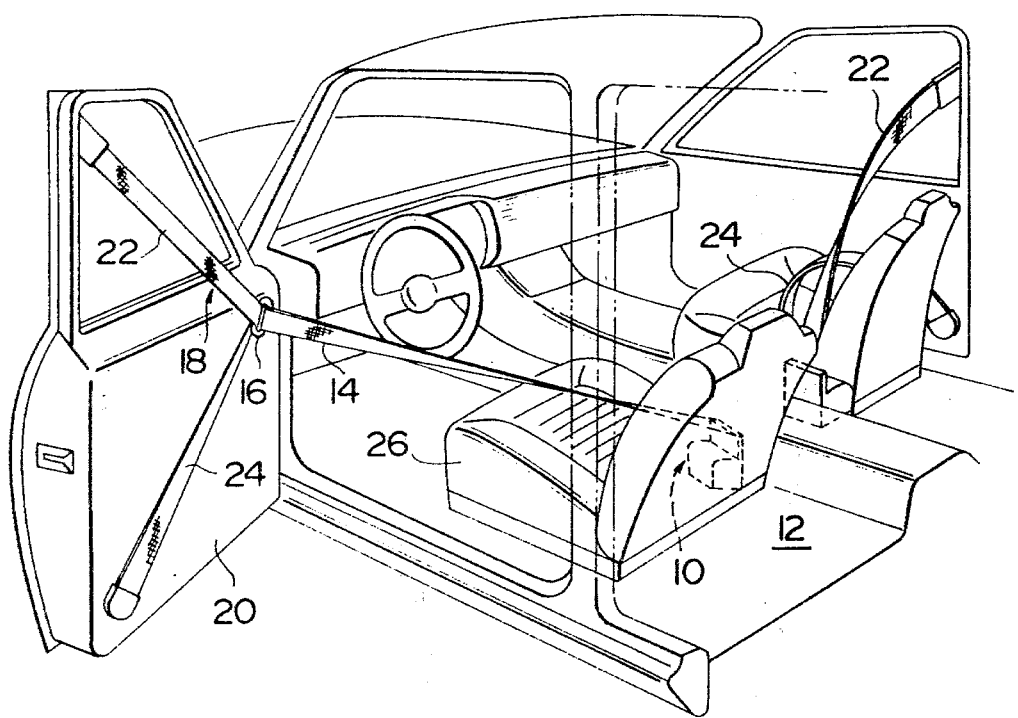
FIG. 1 is a perspective view showing the webbing retractor according to the present invention being mounted on the vehicle.

FIG. 1 is a perspective view showing the vehicle on which is mounted a webbing retractor 10 according to the present invention. Said retractor 10 is secured to a floor portion 12 of the vehicle body at the substantially central portion of the vehicle, and adapted to wind up an inner webbing 14 by a biasing force thereof.

Secured to the forward end portion of said inner webbing 14 is a ring 16, through which is inserted the intermediate portion of an outer webbing 18. Opposite ends of said outer webbing 18 are engaged with the upper and lower portions of a door 20, respectively, and a portion of the outer webbing 18 above the ring 16 constitutes a shoulder restraining portion 22 and a portion below said ring 16 constitutes a waist restraining portion 24. Accordingly, as shown in FIG. 1, when the door 20 is opened, the webbings 14, 18 are moved forward in the vehicle in a manner to go along a circularly arcuate movement of the door 20, whereby a space for the occupant to enter or leave the vehicle is formed between the inner webbing 14 and an occupant's seat 26. Furthermore, when the occupant closes the door upon being seated, the remaining portion of the inner webbing 14 is wound up by the retractor 10, so that the outer webbing 18 can be fastened to the occupant in a condition of a three-point seatbelt system.

In addition, such a device may be provided as necessary, that which displaces the webbing 14 or 18 forward in the vehicle in accordance with the opening or closing action of the door 20 to thereby further enlarge the space for entering or leaving the vehicle formed between the seat 26 and the webbing 14 or 18.

Figure 2:
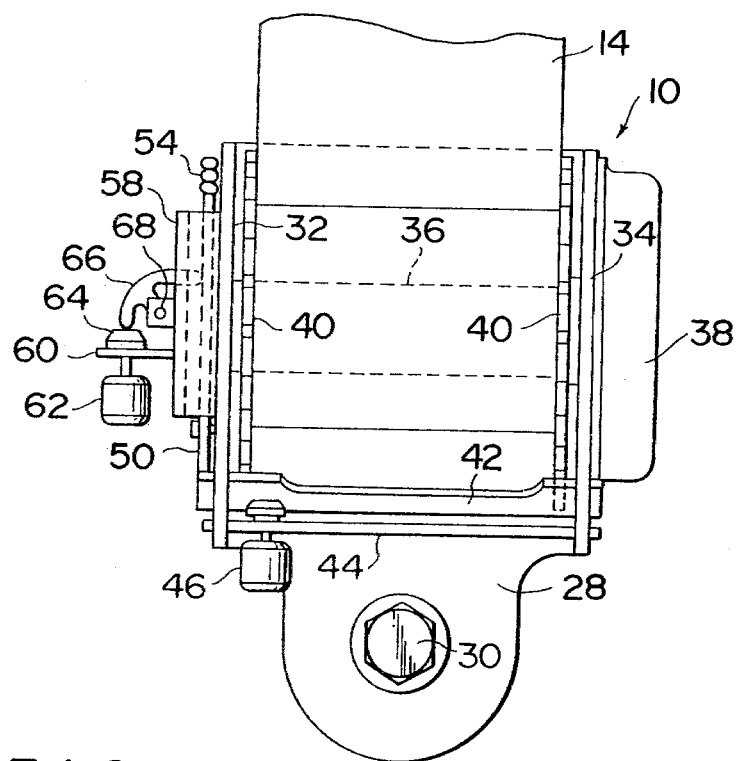
FIG. 2 is a front view showing a first embodiment of the present invention.
Figure 3:
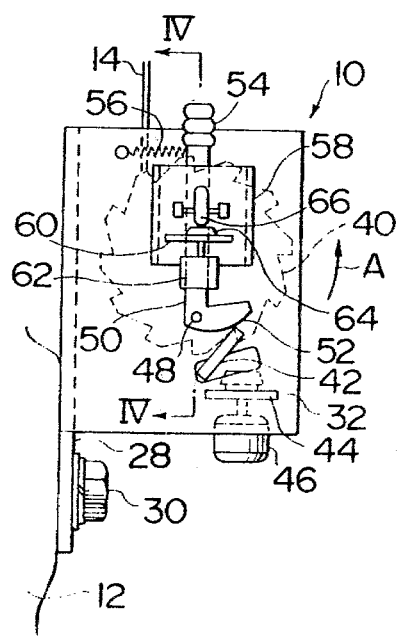
FIG. 3 is a side view of FIG. 2.
Figure 4:
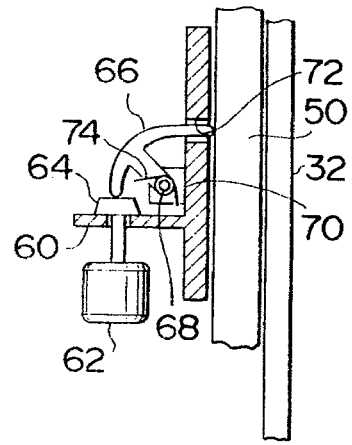
FIG. 4 is a cross-sectional view taken along the line IV—IV in FIG. 3.
Figure 5:
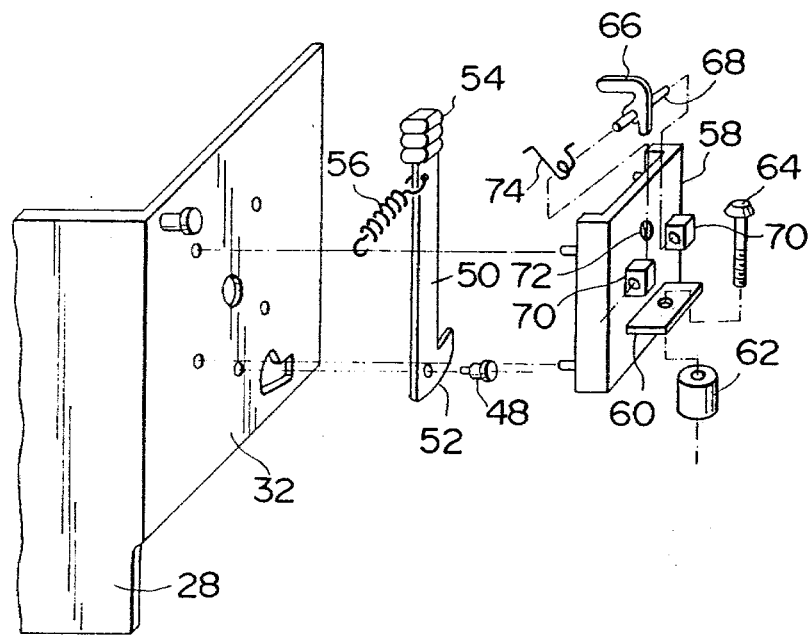
FIG. 5 is a perspective view of FIG. 2 with essential portions being disassembled.

Description will hereunder be given of said webbing retractor 10 with reference to FIGS. 2 and 3. A frame 28 of the retractor is fixed on the floor portion 12 of the vehicle body through a mounting bolt 30.

Pivotally supported by parallel legs 32, 34 of the frame 28 is a windup shaft 36 which winds up the end portion of the inner webbing 14 in layers. Additionally, provided between the windup shaft 36 projecting from the parallel leg 34 and said parallel leg 34 is a spiral spring retractor 38, which biases the windup shaft 36 in a direction of winding the webbing 14 up (indicated by an arrow A).

Solidly secured to the windup shaft 36 are a pair of ratchet wheels 40 which are opposed to a pawl 42 pivotally supported by the parallel legs 32, 34. Said pawl 42 is rested on a pendulum 46 suspended from a bracket 44 racked across the parallel legs 32, 34, stays in the substantially horizontal direction during normal running condition of the vehicle, but, in an emergency of the vehicle such as a collision, is tilted in accordance with the tilting motion of the pendulum 46, whereby said pawl 42 meshes with the ratchet wheels 40 as shown in FIG. 3, so that the windoff rotations of the ratchet wheels 40 and the windup shaft 36 can be stopped.

Pivotally supported on the outside of the parallel leg 32 through a pin 48 is a release lever 50, and a circularly arcuate abutting portion 52 provided at one end portion of said release lever 50 is opposed to the pawl 42 projecting from the parallel leg 32. Additionally, the other end of said release lever 50 is formed into a grip 54 projecting upwardly from the parallel leg 32 as shown in FIG. 3. Further, a tensile coil spring 56 is stretched between said release lever 50 and the parallel leg 32, whereby said circularly arcuate abutting portion 52 is biased in a direction of being separated from the pawl 42, i.e. the counterclockwise direction in FIG. 3.

Consequently, if the occupant rotates the grip 54 in the clockwise direction against a biasing force of the tensile coil spring 56, then the circularly arcuate abutting portion 52 rotates the pawl 42, which has meshed with the ratchet wheels 40 and tilted, to be separated from the ratchet wheels 40, thereby releasing the meshing of the pawl with the ratchet wheels.

A letter 'U' shaped base 58 is secured to the outer surface of said parallel leg 32 in a manner to cover the intermediate portion of the release lever 50. Projected from said letter 'U' shaped base 58 is a horizontal bracket 60 suspending a pendulum 62. Mounted on a head 64 of said pendulum 62 is one end of a letter 'L' shaped stopper 66. A pin extending through the intermediate portion of said letter 'L' shaped stopper 66 is pivotally supported by a bracket 70 projecting outwardly from said letter 'U' shaped base 58, whereby said stopper is rotatable about said pin 68. And, the other end of said letter 'L' shaped stopper 66 is extended through an opening 72 formed in the letter 'U' shaped base 58 in a direction of the parallel leg 32, and opposed to the intermediate portion of the release lever 50 covered by the letter 'U' shaped base 58.

Figure 6:
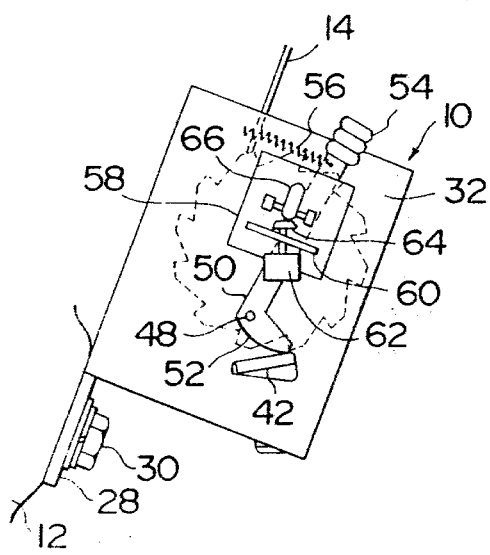
FIG. 6 is an operational diagram of FIG. 3, in which the vehicle is stopped.
Figure 7:
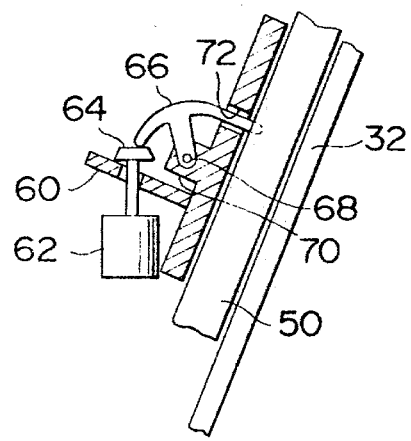
FIG. 7 is an operational diagram of FIG. 4.
Figure 8:
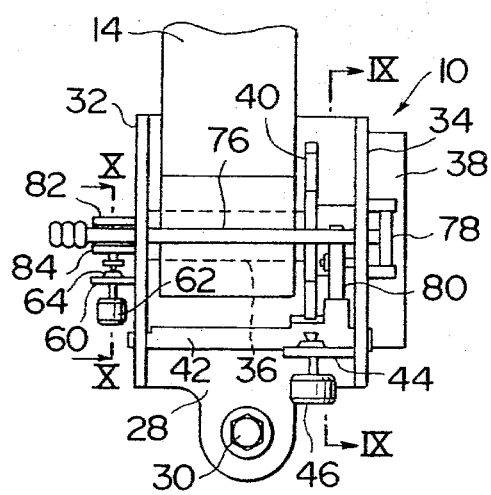
FIG. 8 is a front view showing a second embodiment of the present invention.
Figure 9:
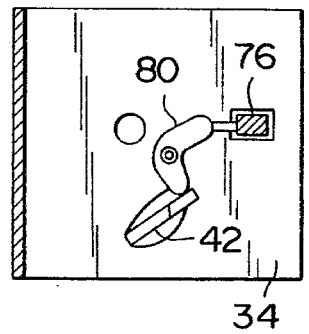
FIG. 9 is a cross sectional view taken along the line IX—IX in FIG. 8.

Here, the pendulum 62 and the letter 'L' shaped stopper 66 constitute a holding device. As shown in FIGS. 6 and 7, when the retractor, i.e., the vehicle is tilted, the pendulum 62 urges up and turns the stopper 66, whereby the stopper 66 interferes with a moving path of the release lever 50 so that such a condition can be held that the release lever 50 has released the meshing of the pawl 42 with the ratchet wheels 40.

Furthermore, interposed between the letter 'L' shaped stopper 66 and the base 58 is a torsional coil spring 74, whereby one end of the stopper 66 is biased in a direction of abutting against the head of the pendulum 64.

In the embodiment as arranged above, if the occupant opens the door 20 to enter the vehicle as shown in FIG. 1, a space for the occupant to enter the vehicle is formed between the seat and the webbings 14, 16, so that the occupant can easily be seated.

If the occupant closes the door 20 upon entering the vehicle, the remaining portion of the webbing 14 is wound up by the retractor 10, so that the shoulder restraining portion 22 and waist restraining portion 24 of the outer webbing 18 can be properly fastened to the occupant. During normal running condition of the vehicle, the retractor 10 winds off a required length of the inner webbing, thus enabling the occupant to arbitrarily change the driving posture.

In case the vehicle is in an emergency such as a collision, the pendulum 46 of the retractor 10 oscillates to tilt the pawl 42, whereby said pawl 42 meshes with the ratchet wheels 40 to suddenly stop the wind-off rotation of the windup shaft 36. Consequently, the inner and outer webbings 14 and 18 are reliably fastened to the occupant, thus securing the safety of the occupant.

Furthermore, in the case the vehicle stopped after the collision, it is necessary for the occupant to escape from the vehicle to the outside. However, the pawl 42 remains meshed with the ratchet wheels 40, the occupant cannot unfasten the webbings and also cannot open the door 20. However, in this embodiment, the release lever 50 is provided, and hence, if the occupant, holding the grip 54, turns the release lever 50, the pawl 42 being meshed with the ratchet wheels 40 is tilted in the direction opposite to the above, so that the meshing of the pawl 42 with the ratchet wheels 40 can be released, thereby enabling the occupant to open the door 20 to escape from the vehicle to the outside (See FIG. 6). Furthermore, in the case the vehicle stops on a slope inclined at a predetermined angle, the pendulum 46 still keeps the pawl 42 tilted, such a disadvantage is presented that release of the meshing of the pawl 42 with the ratchet wheels 40 becomes unreliable.

In contrast to the above, in this embodiment, a holding device is provided. Accordingly, if the release lever 50 is turned, the pendulum 62 senses the tilt of the vehicle body to oscillate relative to the retractor 10 as shown in FIGS. 6 and 7. Consequently, the stopper 66 is turned against a biasing force of the torsional coil spring 74 to be projected into the moving path of the release lever 50, whereby the release lever 50 is held in the condition after the turning and the pawl 42 is held in the condition of being separated from the ratchet wheels 40, thereby permitting the occupant to reliably escape from the vehicle to the outside. Additionally, said release lever 50 should naturally be applicable not only to the stopping condition of the vehicle after the collision but also to the stopping condition of the vehicle on a slope at more than a predetermined angle after the completion of normal running.

Next, FIGS. 8 to 11 show a second embodiment of the present invention. In this embodiment, the release lever 76 is pivotally supported by the parallel leg 34 through a rotary shaft 78, whereby the release lever 76 is rotatable in a horizontal plane. A turning force of said release lever 76 is imparted to the pawl 42 through a rocker arm 80 pivotally supported by the leg 34, whereby the meshing of the pawl 42 with the ratchet wheels 40 is released.

Furthermore, secured to the parallel leg 32 are horizontal brackets 82, 84 disposed in parallel with each other and spaced a predetermined distance apart from each other, and the release lever 76 being extended through an opening formed in the parallel leg 32 is movable between said horizontal brackets 82 and 84.

Figure 11:
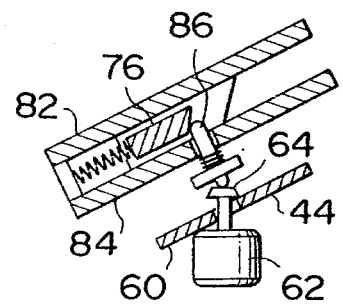
FIG. 11 is an operational diagram of FIG. 10.

Additionally a pendulum 62 is suspended from a horizontal bracket 60 outside the parallel leg 32 in the same manner as in the preceding embodiment. A stopper 86 is urged up by the pendulum 62 to rectilinearly, vertically, upwardly move, and adapted to rise through the horizontal bracket 84. As shown in FIG. 11, when the vehicle is tilted, the stopper 86 abuts against the release lever 76 in the condition where the release lever 76 releases the meshing of the pawl 42 with the ratchet wheels 40, whereby the condition after the release lever 76 has been turned is held.

Figure 10:
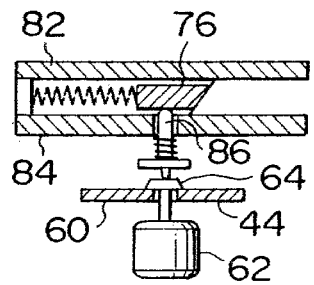
FIG. 10 is a cross-sectional view taken along the line X—X in FIG. 8.
Figure 12:
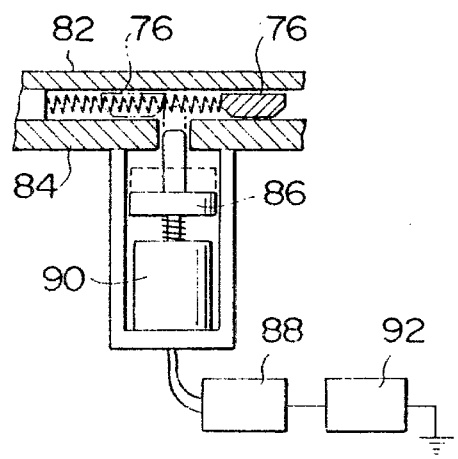
FIG. 12 is a cross-sectional view corresponding to FIG. 10, in which a third embodiment of the present invention is shown.

Next, FIG. 12 is a cross-sectional view showing a third embodiment of the present invention and corresponding to FIG. 10 in the preceding embodiment.

In this embodiment, an electric acceleration sensor 88 and an electromagnetic solenoid 90 are provided to constitute a holding device, and said electric acceleration sensor 88 is connected to a vehicle power source 92. Said acceleration sensor 88 is of such an arrangement that, for example, mercury contained in a vessel is adapted to sense a predetermined tilting angle to close a circuit, whereby the electromagnetic solenoid 90 raises the stopper 86, so that the condition after the release lever 76 is turned is held in the same manner as in the preceding embodiment.

Furthermore, in the embodiments as described above, explanation has been given of the windup shaft meshing with the pawl through the ratchet wheels. However, it should be naturally possible to adopt construction in which the pawl directly meshes with the windup shaft.

As has been described above, the webbing retractor according to the present invention offers such advantages that a release bar is provided which releases the meshing of the pawl with the windup shaft as necessary, so that the occupant can readily unfasten the webbing when escaping from the vehicle after a collision, and, a holding device is provided which holds the operating condition of the release lever, so that the webbing can be unfastened even when the vehicle is stopped at a predetermined inclination.

What is claimed is:

1. A webbing retractor for receiving an occupant restraining webbing in a seatbelt system for protecting an occupant in an emergency of a vehicle, comprising:
    (a) a windup shaft for winding up the occupant restraining webbing;
    (b) a pawl for being tilted in an emergency of the vehicle, meshing with the windup shaft and preventing the webbing windoff rotation of the windup shaft, whereby the occupant is restrained by the webbing;
    (c) a release lever for abutting against and moving said pawl to be released from said meshing with the windup shaft, whereby the webbing windoff rotation of the windup shaft is made possible to unfasten the occupant; and
    (d) a holding device for abutting against the release lever to automatically hold a condition where said release lever has moved the pawl to be separated from the ratchet wheel when the vehicle is tilted.

2. A webbing retractor as set forth in claim 1, wherein said holding device is driven by a pendulum when the vehicle body is tilted.

3. A webbing retractor as set forth in claim 2, wherein said holding device includes a substantially letter 'L' shaped stopper, said stopper being pivotally supported at the intermediate portion thereof, and being projected at one end thereof into a moving path of the release lever to prevent the release lever from returning.

4. A webbing retractor as set forth in claim 1, wherein said release lever is pivotally supported by a frame supporting the windup shaft.

5. A webbing retractor as set forth in claim 4 wherein said release lever is formed at one end thereof into a grip and at the other end thereof into a portion for abutting against the pawl.

6. A webbing retractor as set forth in claim 5, wherein the portion for abutting against the pawl of said release lever is formed into a circularly arcuate abutting portion.

7. A webbing retractor as set forth in claim 5, wherein said release lever is interposed between a letter 'U' shaped base secured to said frame and said frame.

8. A webbing retractor as set forth in claim 4, wherein said release lever is movable between a pair of brackets in parallel with each other and secured to said frame.

9. A webbing retractor for winding up a webbing for restraining and protecting an occupant in an emergency of a vehicle, comprising:
    (a) a frame secured to the vehicle body;
    (b) a windup shaft pivotally supported by said frame for winding up an occupant restraining webbing by a biasing force thereof;
    (c) a ratchet wheel solidly secured to said windup shaft;
    (d) a pawl for meshing with the ratchet wheel when tilted to prevent the webbing windoff rotation of the windup shaft;
    (e) an acceleration sensor for sensing acceleration of the vehicle to tilt said pawl;
    (f) a release lever pivotally supported by said frame and formed at one end thereof into a portion for abutting against said pawl and at the other end into a grip, so that the pawl is separated from the ratchet wheel when the release lever is turned;
    (g) a stopper for holding a condition where said release lever is turned; and
    (h) a member for driving said stopper when the vehicle is tilted, whereby, even if the vehicle is stopped in a tilted condition, the release lever is held in a turned condition and the webbing can be wound off from the windup shaft by the occupant so that the webbing can be unfastened.

* * * * *